Dec. 23, 1969   J. NEVITT   3,485,359

PACKAGE CONVEYOR AND ACCUMULATOR

Filed March 22, 1967

INVENTOR.
JOHN NEVITT
BY Flehr, Hohbach, Test,
Albritton & Herbert
ATTORNEYS

United States Patent Office 3,485,359
Patented Dec. 23, 1969

3,485,359
PACKAGE CONVEYOR AND ACCUMULATOR
John Nevitt, Oakland, Calif., assignor to Granny Goose Foods, Inc., Oakland, Calif., a corporation of California
Filed Mar. 22, 1967, Ser. No. 625,176
Int. Cl. B07c *1/10;* B07b *13/04;* B65g *27/34*
U.S. Cl. 209—99               7 Claims

ABSTRACT OF THE DISCLOSURE

Apparatus and method to be used where several individual packages of items are incorporated in a multiple package container for marketing. Two tray-like shaker sections, one above the other, supply individual packages to a packing station where the packages are manually placed in a marketing container. Additional means conveys the individual packages from the packaging machine to the upper shaker section. The shaker sections function as an accumulator to store and make the individual packages available at the packing station. For packing containers with a variety of products, a plurality of such accumulators are located along a common packing conveyor.

---

This invention relates generally to apparatus and methods for use in package plants where several individual packages of items are incorporated in a common multiple package container for marketing.

It is common in the food and other industries to market products in a carton or container which incorporates a plurality of individual packages. The packages may contain the same product, or may contain a plurality of different products, in which event the container is commonly referred to as a "variety pack." The conventional method used in the food industry for such variety packs is first to introduce the output of each of several packaging machines into bulk containers, and then these bulk containers are moved to an assembly line where the packages are retransferred to the marketing containers. Packing in the bulk containers provides the necessary process storage required to make the assembly operation independent of the production of the several packaging machines. This method provides a low hourly production rate and is relatively costly because of the labor required.

In general, it is an object of the present invention to provide an apparatus and method which makes possible in-line assembly of the individual packages without intermediate packing in bulk containers as described above.

More specifically, it is an object of the present invention to provide a novel apparatus and method which provides for adequate storage of the individual packages as they are being automatically transferred from packaging machines to an assembly line, with packages being presented to the assembly line for direct manual transfer to the marketing container.

Additional objects and features of the invention will appear from the following description in which the preferred embodiment of the invention has been set forth in conjunction with the accompanying drawing.

In general, the apparatus comprising my invention consists of first and second tray-like shaker sections, one end of the first and uppermost section being disposed to receive the individual packages from a packaging machine. The first shaker section serves to convey the packages toward its other end, where they are discharged into the second shaker section. The second shaker section has its one end disposed at or adjacent to a packing station, and this end is provided with a barrier whereby the packages are retained in a region convenient for manual removal at the packing station. In operation, the two cooperating shaker sections form an accumulator. For variety packing, a plurality of such accumulators are disposed along a common packing line to supply a plurality of in-line packing stations.

Referring to the drawing.

Figure 1:
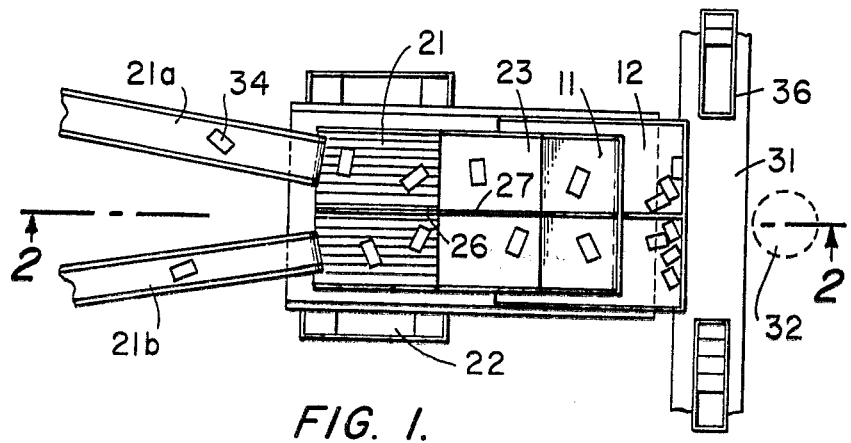
FIGURE 1 is a plan view schematically illustrating apparatus incorporating my invention.

The apparatus schematically illustrated in the drawing consists of a main frame 10 serving to support the tray-like shaker sections 11 and 12. Section 11 is inclined as illustrated and carried by the shaker arms 13 and 14. These arms may be of the type that are attached to the shaker section and to the frame by suitable rubber bushings to permit shaking action with movement of packages from one end to the other. The shaker section 12 is likewise inclined as illustrated, and is carried by the shaker arms 16 and 17. It is desirable to locate section 12 directly below section 11 and with its one end disposed to receive packages from the upper section.

Both of the sections 11 and 12 are driven by suitable means such as an electric motor 18 and eccentric means (not shown) whereby shaking motion is imparted to the sections with a major component in the direction of their length. In general the driving may be similar to the shaking action applied to conventional shaker conveyers.

Figure 2:
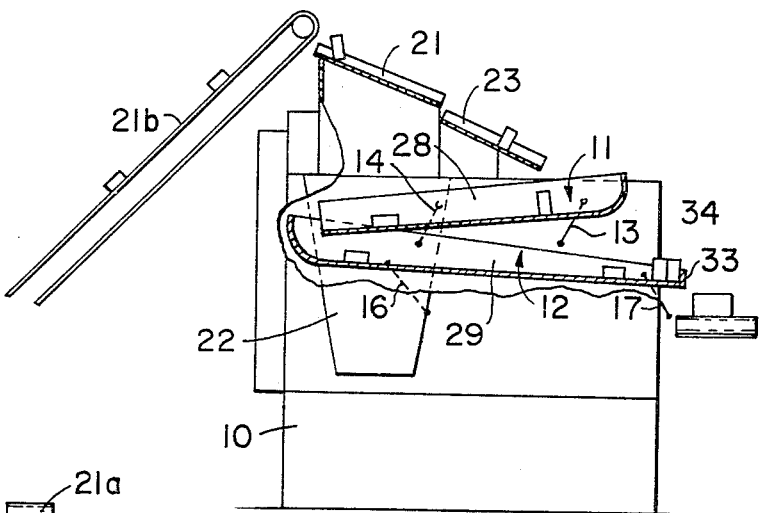
FIGURE 2 is a side elevation in section taken along the line 2—2 in FIGURE 1.
Figure 3:
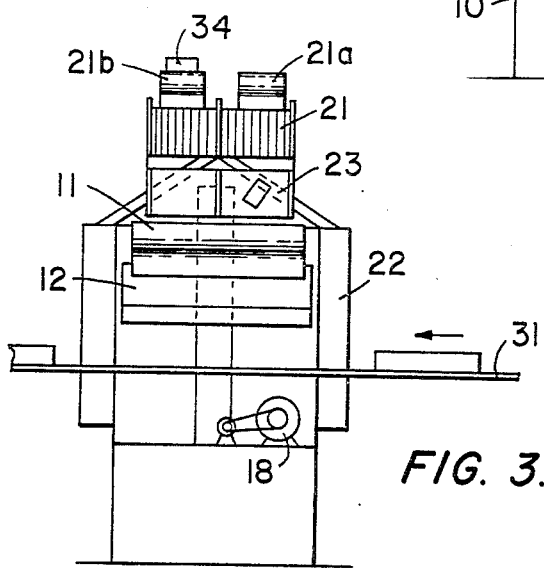
FIGURE 3 is a front view of the apparatus.

Suitable means is provided for continuously supplying one end of the shaker 11 with the packages as delivered by a packaging machine. Thus two belt conveyers 21a and 21b are shown, it being understood that these conveyers receive packages as discharged from a packaging machine. The items within these packages may be the same, or may be different. Instead of arranging the conveyers 21a and 21b whereby they deliver packages directly to the shaker section 11, it is desirable to provide an inclined grid 21 upon which the packages are delivered. This grid consists of spaced bars and is adapted to permit waste material, such as bits of paper and the like, to drop into the waste receptacle 22. Packages discharging from the inclined grid 21 are received by the transfer slide 23 which in turn delivers the packages to one end of the shaker section 11, namely the right hand end as viewed in FIGURE 2.

It is desirable to provide a partition wall 26 extending above the inclined grid 21 to divide the area of the grid into two equal sections. A similar partition 27 is provided for the transfer slide 23. The shaker sections 11 and 12 are likewise provided with aligned central partitions 28 and 29. With the partitions just described it will be evident that packages received by the conveyers 21a and 21b are maintained separate.

The forward end of the shaker section 12 terminates near a packing conveyer 31. The indicated region 32 adjacent the conveyer 31 may be termed a packing station and is occupied by an operator who removes packages from the shaker section 12 and introduces them manually into a marketing container. The forward end of the shaker section 12 is provided with a wall 33, forming a barrier which restrains the packages and prevents them from being freely discharged.

Operation of the apparatus described above is as follows. It is assumed that a single packaging machine supplies packages to the conveyers 21a and 21b and the items or products within these packages are different. Such packages are indicated at 34. The upper ends of the conveyers 21a and 21b continually discharge the packages upon the inclined grid 21. As the packages slide down the inclined grid 21, loose material such as bits of paper and the like drop between the grid bars and accumulate in the receptacle 22. The packages leaving the grid bars 21 pass over the transfer slide 23 to the right hand end of the upper shaker section 11. From the time the packages are delivered by the conveyers 21a and 21b and their delivery to the upper shaker section 11, they are maintained separate by the dividing walls 26 and 27. Within the shaker section 11 the packages are likewise kept separate by the dividing wall 28. The shaking action causes the packages to move toward the rear end of the section 11 with discharge from the rear end into the rear end of the lower shaker section 12. In the shaker section 12 the packages move forwardly into a region near the barrier wall 33 where they are convenient for removal by an operator at the packing station 32. Any packages which are not immediately removed are retained in the forward portion of the shaker 12 by the wall 33.

In the drawing I have indicated marketing containers 36 in the form of tray-like cartons into which the individual packages are introduced by the operator. In the event the supply of packages is temporarily interrupted as by shutdown of the packaging machine supplying the conveyers 21a and 21b, the packing of the packages into a marketing carton may continue without interruption. This is because of the storage of packages provided within the shaker sections 11 an d12 due to the transit time required for their movement from the right hand end of the section 11 to the forward end of the section 12. In other words the shaker sections function as an accumulator.

Although I have described only one unit of apparatus for storing packages and for presenting them to a packing station, my method when applied to producing variety packs involves use of a plurality of such units distributed along a common packing conveyer 31 with a packing station being located adjacent each unit. Thus operators at each unit introduce certain packages into the marketing container. The container then progresses to the next station where additional packages are introduced. Thus continuous in-line packing is made possible without intervening bulk packing.

Various modifications and adaptations of my invention may be made. For example the drive 18 may be of a variable speed type to permit adjustment of the shaking action. The pans 11 and 12 can be mounted to permit adjustment of their inclination to suit various shapes and sizes of objects. Thus the angle may be steepened for packages that do not tend to slide or roll, or made less steep for packages which tend to slide or roll. The grid 21 can be made replaceable or adjustable to provide a variety of bar spacing to suit various sizes and kinds of packages.

In actual operations it has been demonstrated that my apparatus and method makes possible continuous in-line packing into a marketing carton with greatly increased packing efficiency. Thus for a given number and capacity of packaging machines, production of packed containers may be more than ten times that possible with intermediate bulk packing as previously described. This greatly increases the capacity of a given plant, and reduces labor and packing costs.

I claim:

1. In a machine for the handling of packaged products, including non-cylindrical packaged products, where the individual packages are to be placed into a common container for marekting, first and second superposed oppositely inclined tray-like shaker sections, one end of the first section being disposed to receive packages, supply means for presenting packages to said one end of said first section, the first section serving to convey the packages presented thereto by said supply means toward its other discharge end, the second shaker section having its one end disposed below the discharge end of the first section and having its other end located at a packing station, the second section serving to convey the packages received thereon from said first section toward its other end, the second section having a barrier extending across its said other end, thereby causing retention of packages for manual removal at the packing station, and means for vibrating said first and second shaker setcions for effecting movement of packages therealong.

2. A machine as in claim 1 in which each of said tray-like sections has a central partition extending the length of the same.

3. A machine as in claim 1 together with additional means interposed between said supply means and said one end of said first shaker section for receiving individual packages from a packaging machine and presenting the same to the said one end of the first shaker section.

4. Apparatus as in claim 3 in which said additional means includes grid means for removing waste material from said packages passing thereover prior to presentation thereof to said first shaker section.

5. Apparatus as in claim 1 together with a packing conveyer extending horizontally and located adjacent said other end of the second shaker section.

6. A machine as in claim 1 in which each of said inclined first and second shaker sections is mounted to permit adjustment of its angle of inclination so that each such section may be oriented selectively to insure effective movement of said packaged products thereover.

7. In apparatus for the handling of packaged products where the individual packages are to be placed into a common container for marketing, a supply conveyer adapted to receive packaged products, an inclined grid disposed to receive packages from the supply conveyer and serving to effect separation of waste material from the packages, two superpose dand oppositely inclined shaker sections, inclined transfer means serving to transfer packages from the inclined grid to one end of the first shaker section, the first shaker section serving to convey the packages toward its other discharge end, the second shaker section having its one end disposed below the discharge end of the first shaker section and having its other end located at a packing station, the second shaker section serving to convey the package toward its said other end, the second shaker section having a barrier extending across its other end, thereby causing retention of packages for manual removal at the packing station, and a horizontal packing conveyer disposed at the packing station and near said other end of the second shaker section.

References Cited

UNITED STATES PATENTS

| | | | |
|---|---|---|---|
| 1,118,221 | 11/1914 | Pantaze | 198—220 X |
| 2,915,162 | 12/1959 | Umstead | 193—27 |
| 3,269,534 | 8/1966 | Clark | 209—85 |

M. HENSON WOOD, Jr., Primary Examiner

R. H. SCHACHER, Assistant Examnier

U.S. Cl. X.R.

193—27; 198—220